Dec. 31, 1957  A. EBERHARD  2,817,980
MULTI-THROW CRANKSHAFT
Filed Aug. 29, 1951  2 Sheets-Sheet 2

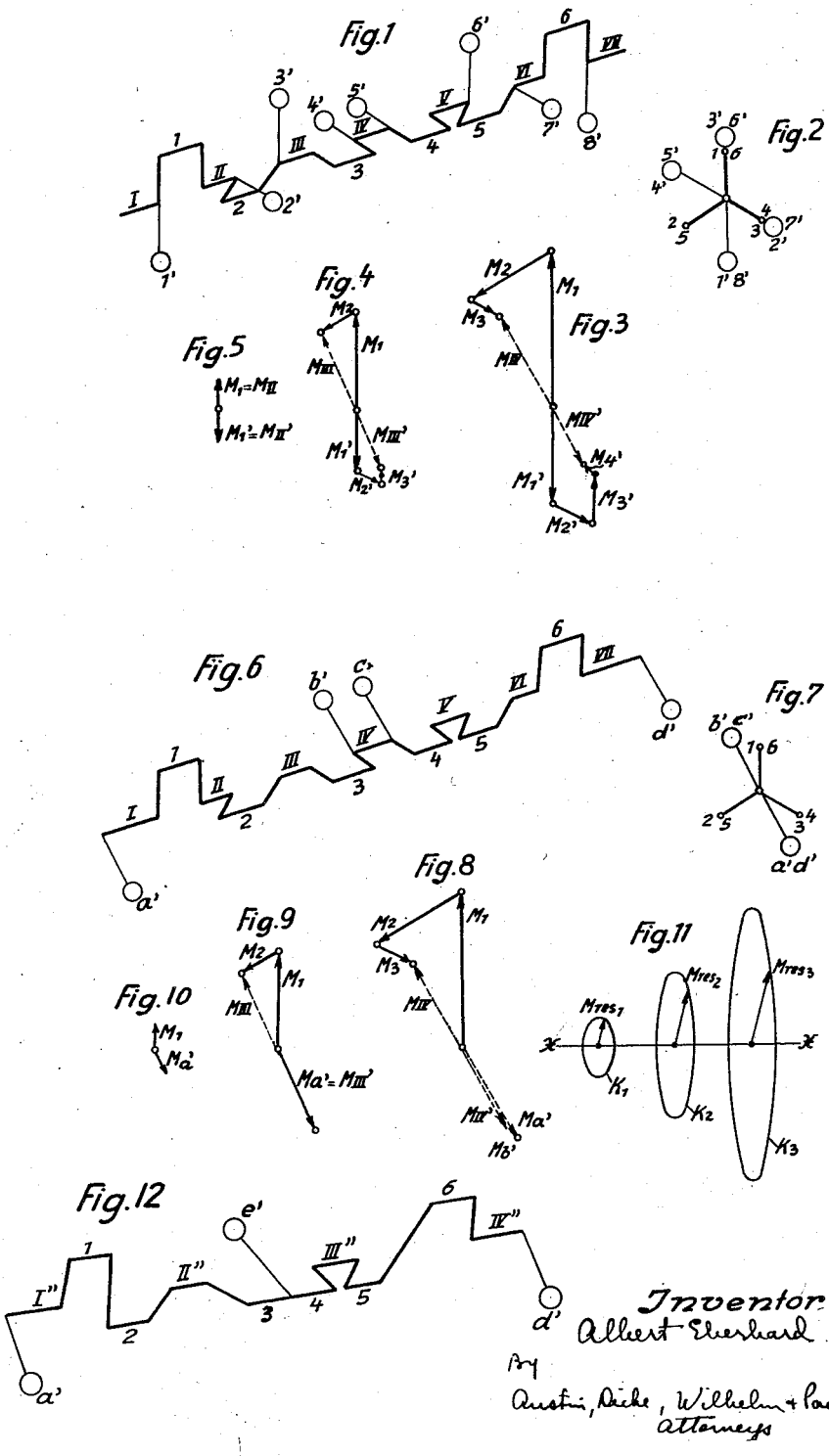

Inventor
Albert Eberhard
By
Austin, Dicke, Wilhelm & Padlon
attorneys

United States Patent Office 2,817,980
Patented Dec. 31, 1957

2,817,980

MULTI-THROW CRANKSHAFT

Albert Eberhard, Goppingen, Wurttemberg, Germany, assignor to Daimler-Benz Aktiengesellschaft, Stuttgart-Unterturkheim, Germany Application August 29, 1951, Serial No. 244,194

Claims priority, application Germany September 4, 1950

9 Claims. (Cl. 74—603)

The present invention relates to a multi-throw crankshaft such as used in internal combustion engines or other piston engines and, more particularly, to an improved arrangement of counterbalancing weights provided on the crankshaft for the purpose of compensating the forces setting up in the crankshaft internal stresses or bending moments which bend the crankshaft in a direction perpendicular to the axis thereof and which are produced by the rotating and reciprocating masses acting on the cranks.

It is the primary object of the present invention to so distribute such counterbalancing weights lengthwise of the crankshaft as to minimize the resultant bending couple set up by the rotating and reciprocating masses acting on the crankpins and by the counterweights themselves.

More particularly, it is an object of the present invention to reduce the bending couple set up in the crankshaft by an improved lengthwise distribution of the customary counterbalancing weights without materially increasing the total mass of such weights or their effectiveness with respect to their counterbalancing function.

My invention will be described more particularly hereinafter with reference to some specific embodiments thereof which are illustrated in the accompanying drawings in which Fig. 1 is a diagrammatic perspective representation of a six-throw crankshaft having seven main bearings and provided with counterbalancing weights arranged in the manner customary prior to the present invention;

Fig. 2 is a diagrammatic end view of the crankshaft shown in Fig. 1 illustrating the angular disposition of the cranks and of the counterweights;

Fig. 3 is a vector diagram of the internal bending couples effective in the middle main bearing pin IV of the crankshaft illustrated in Figs. 1 and 2, such bending couples resulting from the rotating masses acting on the various crankpins;

Fig. 4 is a vector diagram similar to that of Fig. 3 showing the bending couples effective in the main bearing pin III;

Fig. 5 is a vector diagram similar to that of Fig. 3 showing the bending couples effective in the main bearing pin II;

Fig. 6 is a diagrammatic perspective representation of a six-throw crankshaft having seven main bearing pins provided with counterweights distributed lengthwise of the crankshaft in accordance with my invention;

Fig. 7 is an end view of the crankshaft shown in Fig. 6 illustrating the angular disposition of the cranks and of the counterweights;

Figs. 8, 9 and 10 are vector diagrams of the internal bending couples effective in the different main bearing pins of the novel crankshaft illustrated in Figs. 6 and 7;

Fig. 11 is a diagram illustrating the resultant couples produced by the rotating and reciprocating masses connected to the three crankpins of one half section of the crankshaft shown in Fig. 6;

Fig. 12 is a diagrammatic perspective illustration of a six-throw crankshaft having four main bearings provided with counterweights distributed lengthwise of the crankshaft in accordance with my novel invention;

Figure 13:
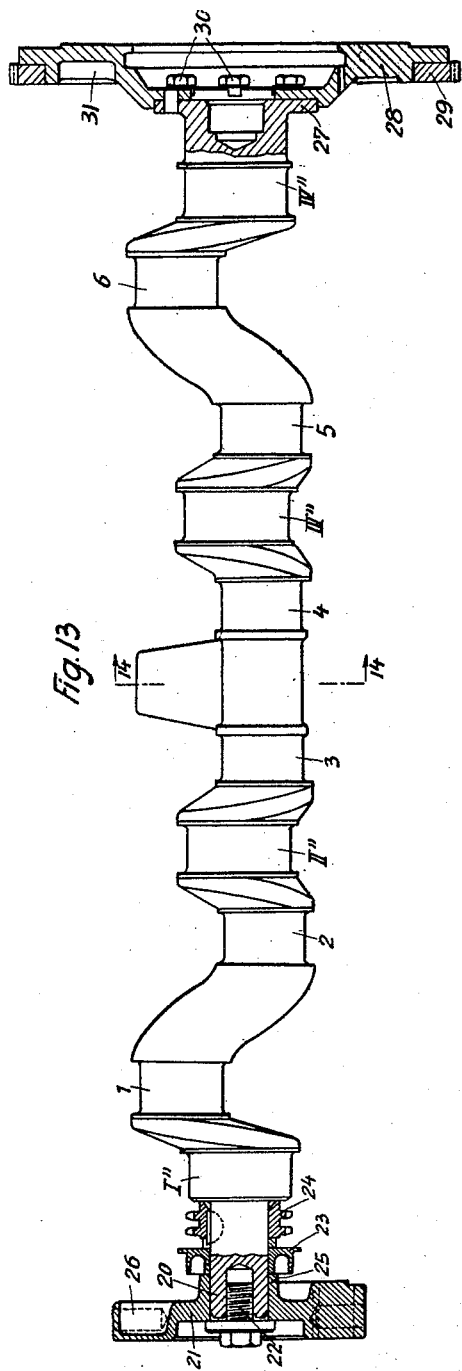
Fig. 13 shows a side view, partly in section, of the crankshaft diagrammatically and perspectively represented in Fig. 12.

In Figs. 1 and 2 the Roman numerals I, II, III, IV, V, VI, and VII denote the main bearing pins of a standard six-throw crankshaft of customary design. 1, 2, 3, 4, 5, and 6 denote the cranks, and $1'$, $2'$, $3'$, $4'$, $5'$, $6'$, $7'$, and $8'$ denote the balancing counterweights with which the crankshaft is provided for the purpose of counterbalancing the masses acting on the cranks.

In Fig. 3 the internal bending couples set up in the main bearing pin IV by the masses acting on the cranks 1, 2 and 3 are illustrated as vectors. $M_1$ is the bending couple produced by the masses acting on the crank 1 having an effective lever of a length corresponding to the distance of crank 1 from the main bearing IV. Similarly, $M_2$ is the bending couple produced in the main bearing pin IV by the masses acting on the crank 2, while $M_3$ is the bending couple set up in the main bearing pin IV by the masses acting on the crank 3. $M_{IV}$ is the resultant couple composed of the individual couples $M_1$, $M_2$ and $M_3$. The lower section of the diagram shown in Fig. 3 illustrates the compensating bending couples $M_1'$, $M_2'$ and $M_3'$ set up in the main bearing pin IV by the counterbalancing weights $1'$, $2'$ and $3'$. $M_{IV}'$ denotes the resultant bending couple, same being the couple set up in the main bearing pin IV by the combined effect of the counterweights $1'$, $2'$ and $3'$. It will be noted that $M_{IV}'$ is substantially smaller than $M_{IV}$ and, therefore, unable to compensate same. It will be found by calculation that with the lengthwise distribution of the counterweights shown in Fig. 1 the masses of the same would become excessive if the counterweights were to be so dimensioned as to make $M_{IV}'$ equal to $M_{IV}$. As a result, a considerable bending couple will be invariably set up in the main bearing pin IV by the combined effect of the masses acting on the crankpins and by the counterweights. Such resultant bending couple tends to unduly deflect the crankshaft and imposes an undesirable load on the main bearing IV. Similar considerations apply to the bending couples set up in the main bearing pin III as shown by the diagram illustrated in Fig. 4 and set up in the main bearing pin II as illustrated by the diagram shown in Fig. 5. The vector diagrams illustrating the bending couples produced in the main bearing pins V and VI are identical with the diagrams shown in Figs. 4 and 5 because of the symmetry of the two half sections of the crankshaft.

It will appear from the foregoing consideration that while in the prior art the counterbalancing weights $1'$, $2'$, $3'$, $4'$, $5'$, $6'$, $7'$, and $8'$ shown in Fig. 1 are so disposed as to relieve the main bearings I, II, III, IV, V, VI, and VII to the greatest possible extent from forces produced by the moving masses, such main bearings are still subject to considerable loads which due to the unavoidable flexibility of the crankshaft are produced by the internal bending couples. It is the object of the present invention to so distribute the counterbalancing weights lengthwise of the crankshaft as to minimize such bending couples for the purpose of a still greater relief of the main bearings. An improved compensation of such internal bending couples can be attained by the simple step of placing the counterbalancing weight $3'$ on the crankarm located at the right of main bearing III and by placing the weight $2'$ on the crankarm at the left of the main bearing II. Such re-distribution of the weights will increase the distances existing between the weights $1'$ and $3'$ on the one hand and existing between the weights 2′ and 4′ on the other hand, thus increasing the counter couples produced by them.

Still better results will be obtained by such an angular relative displacement of the weights 1′ and 2′ and by a similar relative displacement of the weights 3′ and 4′ as to reduce the angle included therebetween causing the weights 1′ and 2′ to approach a medial radial plane and causing the weight 3′ and 4′ to approach a medial radial plane, or even to coincide with such plane.

With such modifications tending to reduce the bending couples set up in the crankshaft by the rotating and reciprocating masses connected thereto the six-throw crankshaft would still require eight counterweights. In Figs. 6 and 7 I have illustrated an embodiment of the present invention in which but four counterweights $a'$, $b'$, $c'$ and $d'$ are provided, the weight $a'$ having been substituted for the weights 1′ and 2′ of Fig. 1 and the counterweight $b'$ having been substituted for the weights 3′ and 4′ of Fig. 1. Similarly, a single weight $c'$ has been substituted for the weights 5′ and 6′ and a single weight $d'$ has been substituted for the weights 7′ and 8′. It will be noted that the counterbalancing weights $a'$ and $d'$ are attached to the outer ends of the outer main bearing pins I and VII. It will be also noted that the crankshaft is free from any counterbalancing weights other than those attached to the outer ends of the outer main bearing pins denoted at $a'$ and $d'$ and the two counterbalancing weights $b'$ and $c'$ attached to the crankshaft near its middle.

In Figs. 8, 9 and 10 the resulting vector diagrams illustrating the bending couples produced in the various line bearing pins of the left half section of the crankshaft are illustrated. Thus, the diagram shown in Fig. 8 illustrates the bending couples set up in the main bearing pin IV. A comparison of Fig. 8 illustrating the effect of my improved arrangement of the counterweights with Fig. 3 illustrating the effect of the prior art counterweights shows the following:

The upper part of the diagram of Fig. 8 is the same as the upper part of the diagram of Fig. 3, either part showing the bending couples produced in the main bearing pin IV by the rotating and reciprocating masses acting on the cranks 1, 2 and 3. The lower parts of the two diagrams, however, differ. The polygon formed by the vectors $M_1'$, $M_2'$, $M_3'$, $M_4'$ and by the vector $M_{IV}'$ has been replaced by the coinciding vectors $M_a'$ and $M_b'$ representing the bending couples produced by the weights $a'$ and $b'$, the vector $M_b'$ being opposed to the vector $M_a'$ and approaching zero. The diagram of Fig. 8 shows that compared with the prior art crankshaft of Fig. 1 much smaller counterweights will suffice to produce the couple $M_{IV}'$ of the same size as shown in Fig. 3 or even a more powerful couple, more particularly a couple $M_{IV}'$ that equals $M_{IV}$. The bigger leverage of the counterweight $a'$ with respect to the main bearing IV obtained by the provision of the counterweight on the outer end of the outer main bearing pin of the crankshaft contributes to a particular degree to the reduction of the counterweight $a'$ and, consequently, to a reduction of the counterweight $b'$.

The diagram shown in Fig. 9 illustrating the bending couples set up in the main bearing pin III will show that only the mass effects acting on the cranks 1 and 2 and the centrifugal force produced by the counterweight $a'$ will be controlling. Similarly, Fig. 10 shows that the bending couple produced in the main bearing pin II is caused by the masses acting on the crank 1 and by the counterweight $a'$ only. Otherwise the remarks made hereinabove with respect to Fig. 8 apply equally to Figs. 9 and 10. While it is true that the bending couples in the main bearing pin II shown in Fig. 10 do not fully compensate each other, such bending couples are extremely small so that the small unbalance may be tolerated.

The bending couples produced in the main bearing pins of the crankshaft by the masses acting on the crankpins can be represented by rotating vectors. Each such rotating vector will fluctuate since the couples are produced by rotating masses as well as by reciprocating masses. Therefore, the rotating vectors can be represented by the substantially elliptical curves $k_1$, $k_2$, $k_3$ indicated in Fig. 11, such curves representing the paths described by the arrow points of the vectors $M_{res1}$, $M_{res2}$, and $M_{res3}$ which rotate with the crankshaft and fluctuate in time with the rotation thereof.

When the reciprocating mass forces of the 2nd order are taken in consideration, the elliptical curves will gain rather complicated shapes which, however, will have no bearing on the point to be made hereinafter. The point is that the resultant vectors $M_{res}$ of the different cranks will, during their revolution about the axis $x$—$x$ of the crankshaft, stay substantially in the same radial plane. This fact paves the way for a common compensation of the bending couples by the counterweights $a'$, $b'$, $c'$ and $d'$ located within the same plane as shown in Figs. 6 and 7.

The compensation of the internal mass forces is the more important the higher the number of revolutions and the higher the consequent centrifugal forces of the rotating masses will be and the more flexible the crankshaft will be. Therefore, the invention is of particular importance when applied to crankshafts having a comparatively high degree of flexibility, such as the crankshaft shown in Fig. 12 having but four main bearing pins I″, II″, III″ and IV″ and the six cranks 1, 2, 3, 4, 5, and 6. It will be noted that a single middle counterweight $e'$ has been substituted for the pair of counterweights $b'$ and $c'$ attached to the middle main bearing pin IV of Figs. 6 and 7.

Here again the counterbalancing weights $a'$ and $d'$ are so angularly disposed with respect to the adjacent cranks 1 and 2 as to be substantially located within the plane of and as to counteract the resultant bending couple set up by the rotating and reciprocating masses acting on the cranks 1′ and 2′. Preferably, the bending couples produced by the counterbalancing weights $a'$ and $d'$ equal substantially the total of the bending couples set up by the rotating masses acting on the cranks and by half of the reciprocating masses acting on the cranks.

Figure 14:
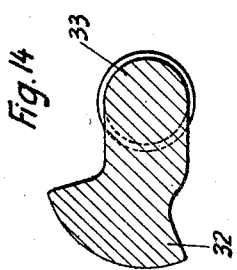
Fig. 14 is the section taken along the line 14—14 of Fig. 13 showing a single counterweight attached to the crankshaft in the middle thereof.

In Figs. 13 and 14 I have illustrated the crankshaft diagrammatically shown in Fig. 12. It will be noted that this crankshaft is a six-throw shaft of an internal combustion engine having the crankpins 1, 2, 3, 4, 5, and 6 and the main bearing pins I″, II″, III″, IV″. The outer main bearing pin I″ is outwardly extended by a trunnion 20 on the end of which a disk 21 is attached for common rotation with the crankshaft, for instance by a splined connection not shown. The disk is held in position on the trunnion 20 by a bolt 22 screwed into a tapped boring of the trunnion 20, suitable spacers 23 and 24 being interposed between a hub portion 25 of the disk 21 and the end face of the main bearing pin I″. For the purposes of the present invention the right hand face of the disk 21 is provided near its periphery with a recess 26. Moreover, the axial width of the disk 21 is smaller near the recess 26 than at the place diametrically opposite thereto. As a result, the center of gravity of the disk 21 will be spaced from the axis of the crankshaft. The distance of that center of gravity from the axis is so dimensioned that the disk acts as the counterweight $a'$ in accordance with the diagrams shown in Figs. 8, 9 and 10.

The other outer main bearing pin IV″ is outwardly extended and provided with a flange 27 to which a disk 28 is attached, such disk constituting the customary flywheel carrying a peripheral toothed ring 29 for engagement with the starter pinion, the disk 28 being attached to the flange 27 by bolts 30. For the purpose of the present invention the disk 28 is provided with a recess 31 on the one side of its axis so as to space the center of gravity of the flywheel 28, 29 from the axis of the crankshaft. In this manner, the flywheel will act as the counterbalancing weight $d'$ shown in Fig. 12. It will be understood from the foregoing description that the spacing of the center of gravity from the axis and the mass of the flywheel are so correlated to the rotating and reciprocating masses acting on the cranks 4, 5 and 6 that the flywheel will set up a bending couple in the crankshaft which counteracts the resultant bending couples produced by the rotating and reciprocating masses connected to the cranks. At the same time, of course, the counterweight constituted by the flywheel 28 will balance the mass effects so as to minimize vibration of the engine in a manner well known in the art.

The single counterweight e' attached to the middle of the crankshaft as shown in Fig. 12 is constituted in the present embodiment by a lateral arm 32 integral with the middle section 33 of the crankshaft that connects the two crank pins 3 and 4.

In conclusion I wish to briefly reiterate that in the prior methods of balancing the mass effects on crankshafts by counterweights attached to the crankshaft efforts were made to relieve the main bearings of the forces produced by the rotating masses, i. e. by the crank arms and crank pins and the rotating portions of the connecting rods. Such efforts were based on the assumption that the main bearings of the crankshaft were loaded by those forces only, or substantially by those forces only, which were acting on the two adjacent cranks. However, the considerable influence produced on the load of a main bearing by the distant cranks was not taken into consideration and the internal bending couples set up in the crankshaft were likewise entirely disregarded and no attention whatsover was given such internal couples as tend to flex the crankshaft without producing external forces acting on the bed of the engine. I have discovered, however, that particularly with high speeds such internal bending couples are of basic importance for both the deflection and strength of the crankshaft and the load imposed on the main bearings and the housing carrying same, more particularly on the ends of the main bearings.

It is the essence of the invention described hereinabove that the counterbalancing weights provided on the crankshaft are so re-arranged as to perform the dual function of compensating the external mass forces setting up vibration in the engine being transferred to the bed thereof and of minimizing the internal bending stress produced in the crankshaft by such masses. This object is attained by a re-distribution of the counterbalancing weights lengthwise of the crankshaft and angularly. In this manner, I minimize the internal bending couples without substantially affecting the compensation of the external mass forces. Viewed under a more specific aspect, the present invention resides in the provision of some of the counterweights at the ends of the outer main bearing pins of the crankshaft thereby securing the advantage that smaller balancing weights than used heretofore will efficiently reduce the internal couples. Intermediate the ends of the crankshaft a single middle counterbalancing weight will suffice in the absence of a middle main bearing. If the crankshaft is provided with a middle main bearing pin a pair of counterweights, one at either end of such middle main bearing pin, may be provided. Such an arrangement of the counterweights has been rendered possible by the fact that the bending couples set up by the rotating and oscillating torques act in the same radial plane of the crankshaft with the different cranks, such bending couples fluctuating in time with the revolution. Because of such fact a plurality of angularly displaced counterweights may be safely replaced by a single resultant counterweight. The larger lever on which such resultant counterweight will act permits of reducing the mass of the counterweight and the consequent total weight of the crankshaft without impairing the effectiveness of the counterweight. Thus, my invention provides a highly efficient compensation of the internal couples with the smallest counterweights and a considerable reduction of the loads on the main bearings.

According to another feature of the present invention not only the rotating masses but also the reciprocating masses of the connecting rods and the pistons are taken in consideration by so dimensioning the counterweights that the couples produced by the same equal the total of the rotating couples and of half the maximum of the oscillating couples. Since the oscillating couples will vary between zero and a maximum during the revolution of the crankshaft at each crank, the rotating couples remaining constant, the best possible compensation of the bending couples will be attained in this manner.

The provision of the counterweights at the ends of the outer main bearing pins of the crankshaft involves the additional advantage of a simplified structure of the crankshaft, since the counterweights may be constructed as disks or rings having unilateral recesses or lumps of material. Such disk-shaped counterweights may be constituted by elements of the engine, for instance by the flywheel or by the customary pulley provided for the fan belt drive.

The invention is applicable to the crankshafts of straight multicylinder engines or to the crankshafts of V-type engines. When applied to crankshafts of very great length composed of sections which may be individually compensated, each section of the crankshaft may be constructed in accordance with the present invention.

The invention is applicable irrespective of whether or not the crankshaft is balanced with respect to the external mass effects. It is applicable for instance to engines having crankshafts including cranks of different dimensions or having crankshafts acting partly as driving shafts for power-consuming machinery.

While my invention has been described hereinabove by reference to some preferred embodiments thereof, I wish it to be clearly understood that my invention is in no way limited to the details thereof but is capable of numerous modifications within the scope of the appended claims.

What I claim is:

1. A multi-throw crankshaft having at least two main bearing sections, a plurality of cranks located between said bearing sections and at least three counterbalancing weights attached to said crankshaft, at least one of said weights being attached to said crank shaft near its middle and the two outermost of said weights being located outwardly of the outermost of said main bearing sections, said crankshaft being balanced as to external forces and moments without said weights while said weights being so dimensioned as to minimize the bending couple set up in the crankshaft by the rotating and reciprocating masses connected thereto, the crankshaft being free from any counterbalancing weights other than those recited.

2. A multi-throw crankshaft of the inherently balanced type as to external forces and moments having main bearing sections located near its ends and at least one main bearing section located near its middle, a plurality of cranks located between said first-mentioned bearing sections and counterbalancing weights attached to said crankshaft, two of said weights being attached to said crankshaft near said middle main bearing section and the two outermost of said weights being located outwardly of the outermost of said main bearing sections, said weights being so dimensioned as to minimize the bending couple set up in the crankshaft by the rotating and reciprocating masses connected thereto and lying substantially in a common plane passing through the axis of said crankshaft.

3. A multi-throw crankshaft of the inherently balanced type as to external forces and moments having at least two main bearing sections, a plurality of cranks located between said bearing sections and a plurality of counterbalancing weights attached to said crankshaft, the two outermost of said weights being located outwardly of the outermost of said main bearing sections, said weights being so angularly disposed with respect to the adjacent cranks as to be located substantially in the plane of, and as to counteract the resultant bending couple set up in the crankshaft by the rotating and reciprocating masses connected to the crankshaft.

4. A multi-throw crankshaft having at least two main bearing sections, a plurality of cranks located between said bearing sections and at least three counterbalancing weights attached to said crankshaft, said crankshaft being balanced as to external forces and moments without said counterbalancing weights, the two outermost of said weights being located outwardly of the outermost of said main bearing sections, and at least one of said weights being attached to said crankshaft near its middle, said first mentioned counterbalancing weights being so angularly disposed with respect to the adjacent cranks as to be substantially located within the plane of, and as to counteract the resultant bending couple set up by the rotating and reciprocating masses acting on the adjacent cranks, the bending couples produced by said counterbalancing weights equalling substantially the total of the bending couples set up by the rotating masses acting on the cranks and by half of the reciprocating masses acting on the cranks.

5. A multi-throw crankshaft of the type inherently balanced as to external forces and moments having at least two main bearing sections, a plurality of cranks located between said bearing sections and at least three counterbalancing weights attached to said crankshaft, at least one of said weights being attached to said crankshaft near its middle and the two outermost of said weights being located outwardly of said main bearing sections, all of said weights being arranged essentially in a common plane passing through the axis of the crankshaft.

6. A six-crank crankshaft of the type inherently balanced as to external forces and moments having at least two main bearing sections, a plurality of cranks located between said bearing sections and at least three counterbalancing weights attached to said crankshaft, at least one of said weights being attached to said crankshaft near its middle and the two outermost of said weights being located outwardly of said main bearing sections, all of said weights being arranged essentially in a common plane passing through the axis of the crankshaft.

7. Multi-crank crankshaft according to claim 5 in which the counterbalancing weights are so angularly disposed with respect to the adjacent cranks as to be substantially located within the plane of, and as to counteract the resultant bending couple set up by the rotating and reciprocating masses acting on said adjacent cranks.

8. Multi-crank crankshaft according to claim 5 in which all of the counterweights are so dimensioned and arranged as to counteract the resultant bending couple set up by the rotating and reciprocating masses acting on the adjacent cranks, the bending couples produced by said counter-balancing weights equalling substantially the total of the bending couples set up by the rotating masses acting on the cranks and by half of the reciprocating masses acting on the cranks.

9. A multi-throw crankshaft of the type inherently balanced as to external forces and moments having main bearing sections located near its ends and at least one main bearing section located near its middle, a plurality of cranks located between said first mentioned bearing sections and three counter-balancing weights attached to said crankshaft, one of said weights being attached to said crankshaft near said middle main bearing section, and the two outermost of said weights being located outwardly of said main bearing sections, all of said weights being so located that their centers of gravity lie in substantially a single plane which passes through the axis of the main bearing sections, the two end weights being located at one side of said axis and the central weight lying on the other side of said axis.

References Cited in the file of this patent

UNITED STATES PATENTS

| 778,542 | Krebs | Dec. 27, 1904 |
| 1,253,586 | Gordan | Jan. 15, 1918 |
| 1,645,717 | Oldson | Oct. 18, 1927 |
| 1,783,664 | McGovern | Dec. 2, 1930 |
| 1,944,013 | Meyer | Jan. 16, 1934 |
| 2,020,406 | Ford | Nov. 12, 1935 |
| 2,419,274 | McDowall et al. | Apr. 22, 1947 |
| 2,632,340 | Dolza et al. | Mar. 24, 1953 |

FOREIGN PATENTS

| 850,966 | Germany | Sept. 29, 1952 |

OTHER REFERENCES

Ser. No. 345,771, Berger (A. P. C.), published May 4, 1943.